No. 825,008. PATENTED JULY 3, 1906.
R. L. SHAW.
GUARD FOR SPINDLE MOLDING MACHINES.
APPLICATION FILED JUNE 26, 1905.
2 SHEETS—SHEET 1.
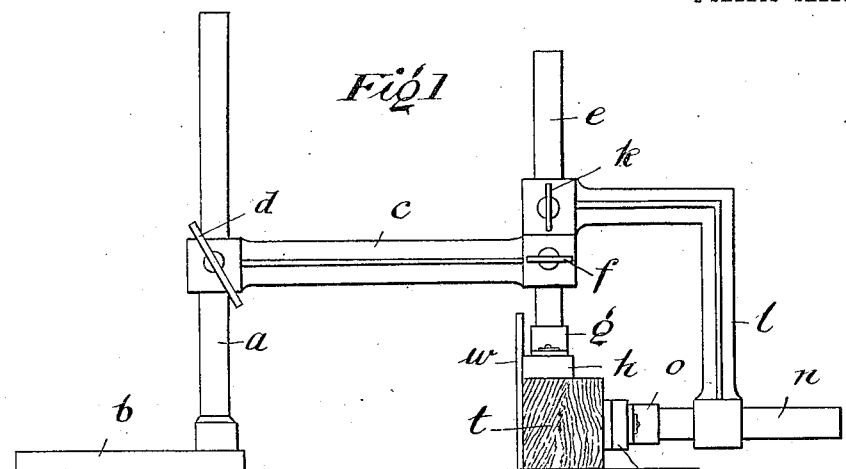
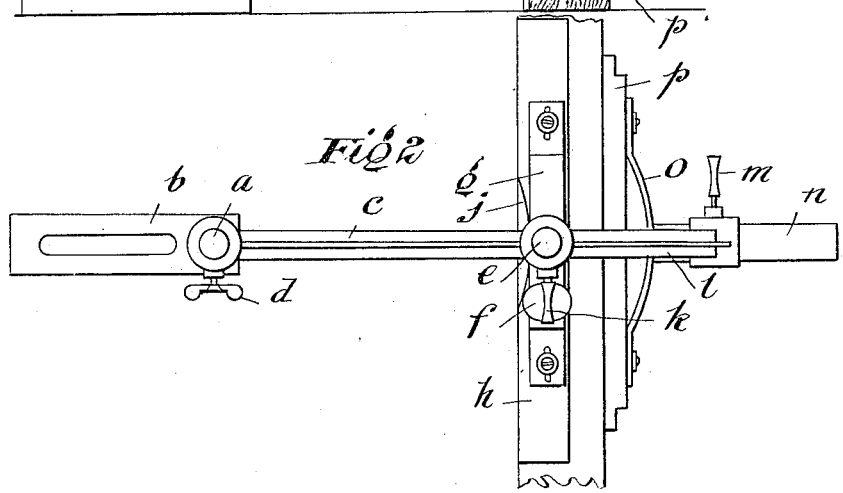
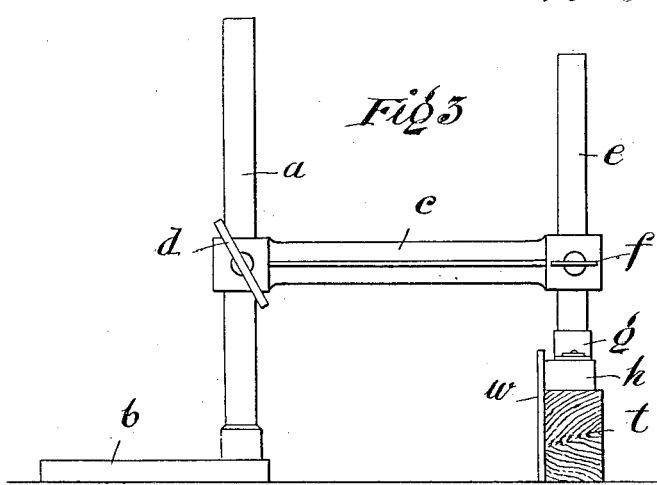

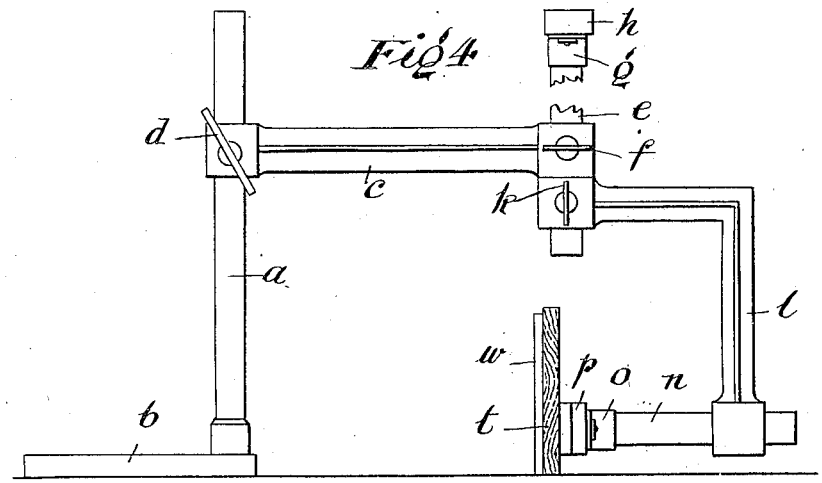
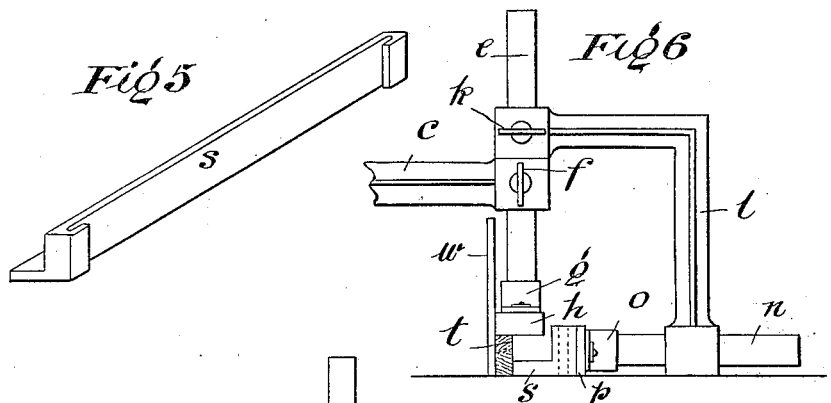
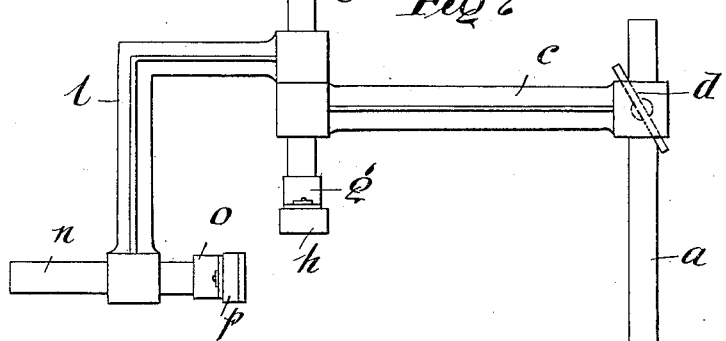

UNITED STATES PATENT OFFICE.

RICHARD LORANCE SHAW, OF BARNES, ENGLAND.

GUARD FOR SPINDLE-MOLDING MACHINES.

No. 825,008.  Specification of Letters Patent.  Patented July 3, 1906.

Application filed June 26, 1905. Serial No. 267,122.

*To all whom it may concern:*

Be it known that I, RICHARD LORANCE SHAW, a subject of His Majesty the King of Great Britain, residing at Priory View, White Hart Lane, Barnes, in the county of Surrey, England, have invented certain new and useful Improvements in Guards for Spindle-Molding Machines, (for which I have made applications for patents in Great Britain, No. 14,816, dated July 1, 1904, and in Germany, dated May 30, 1905, the number of which is not yet known,) of which the following is a specification.

This invention relates to an apparatus for holding material in position on the tables of spindle-molding machines, and has for its object to obviate any possibility of the hands of the workman coming into contact with the rapidly-revolving cutters and being mutilated thereby.

Referring to the accompanying drawings, Figure 1 is a side elevation of the guard constructed in accordance with my invention. Fig. 2 is a plan view of the guard as illustrated by Fig. 1. Fig. 3 is a side elevation of a part of the guard which may be employed alone. Fig. 4 is a side elevation of the guard, illustrating another example of its use. Fig. 5 is a perspective view of a detail hereinafter to be described. Fig. 6 is a side elevation of the guard as used with the detail illustrated by Fig. 5. Fig. 7 illustrates how the guard is placed out of use when not required.

In carrying my invention into effect I mount in any convenient position upon the table of a spindle-molding machine a post or support $a$, having preferably a slotted base $b$ for the purpose of ready adjustment in well-known manner. Upon such post $a$ is mounted an arm $c$, arranged to be readily adjusted to the required position by means of a thumb-screw $d$ or equivalent means and adapted at its outer end to receive a preferably circular rod $e$, which may also be readily adjusted with relation to its carrying-arm by a thumb-screw or the like $f$. To such rod $e$ is connected a plate-spring $g$, fixed to a cross piece or bar $h$, formed of wood or other suitable material, and provided with a curved recess $j$ to permit the requisite clearance for the cutters of the molding-machine.

For use in connection with the said rod $e$ and adapted by means of a thumb-screw or the like $k$ to be adjustably mounted thereon when required I also provide a second arm $l$, which is bent at right angles, or thereabout, and arranged at its lower end to receive in adjustable connection therewith and be fixed in the desired position by means of a thumb-screw or the like $m$, a second rod, $n$, similarly provided, as in the case of that already referred to, with a plate-spring $o$, carrying a cross-piece $p$. The latter may, however, in certain circumstances be employed in conjunction with an additional cross-piece $s$ of L-section and provided with return ends, as shown in Fig. 5, for engaging with the ends of the cross-piece $n$ which are reduced in thickness for this purpose.

In use and referring to Fig. 1, the apparatus for general purposes is employed for holding the material by so adjusting the arm $c$ that on the work $t$ being placed against the fence $w$ the rod $e$ mounted in the arm $c$ may be adjusted, so that the cross-piece $h$ thereof bears against the work $t$ in a downward direction, the bent arm $l$ being then adjusted so that the rod engaging the lower end thereof may be brought up to and bear against the work in a horizontal direction, whereat the workman has only to effect the passage of the work past the cutters without having at the same time to press and keep the work thereupto, and as such passage of the work is effected at either end thereof alternately the hands of the workman are never in proximity to the rapidly-revolving cutters.

In some cases I may, as shown in Fig. 3, dispense with the second or bent arm $l$ and cross-piece $n$ carried thereby and hold the material by a downward pressure only; or, as illustrated by Fig. 4, I may reverse the position of the rod $e$ and cross-piece $h$ and on the end of said rod, projecting through its carrying-arm $c$, mount the bent arm $l$, so as to hold the material, as shown, by a horizontal pressure only.

With reference to Figs. 5 and 6, where the work is too small to permit the cross-pieces $h$ and $p$ to act in the manner illustrated in Fig. 1, the L-shaped cross-piece $s$ may be slipped over the reduced ends of the cross-piece $p$ and so permit the work to be held by both a downward and horizontal pressure, notwithstanding its small sectional area.

Immediately the apparatus is not required it may easily be swung round to the back of the machine and retained there out of the way, as shown in Fig. 7, until it is again needed, when it can as readily be replaced.

With a guard substantially so constructed and arranged the difficulty of working both vertical and horizontal spindles without endangering the workmen's fingers is overcome and this by means of an apparatus simple in action and use, thereby enabling the workmen to produce a larger quantity and at the same time a better class of work.

Having thus described my invention, what I claim as new, and desire to secure by Letters Patent, is—

In combination, a post, a base for the post, an arm mounted on the post and rotatable thereon, said arm being also longitudinally adjustable on the post, a rod carried by the arm, said rod being adjustable longitudinally its length with relation to the arm, said rod being also rotatably mounted in the arm, a foot on the rod, an L-shaped arm slidably and rotatably mounted on the rod at one end; a rod slidably and rotatably carried by the free end of the L-shaped rod and a buffer on the last-named rod.

In witness whereof I have hereunto set my hand in presence of two witnesses.

RICHARD LORANCE SHAW.

Witnesses:
 ALBERT GEORGE BARNES,
 LEONARD COULSON.